US012118183B2

(12) United States Patent
Li et al.

(10) Patent No.: US 12,118,183 B2
(45) Date of Patent: Oct. 15, 2024

(54) ADAPTIVE DISCUSSION-TOPIC SYSTEM, OPERATING METHOD THEREOF, AND NON-TRANSITORY COMPUTER-READABLE RECORDING MEDIUM

(71) Applicant: Framy Inc., Grand Cayman (KY)

(72) Inventors: Yu-Hsien Li, Taipei (TW); Yu-Chih Lee, New Taipei (TW); Hao-Wen Mei, Taipei (TW)

(73) Assignee: FRAMY INC., Grand Cayman (KY)

( * ) Notice: Subject to any disclaimer, the term of this patent is extended or adjusted under 35 U.S.C. 154(b) by 0 days.

(21) Appl. No.: 18/304,355

(22) Filed: Apr. 21, 2023

(65) Prior Publication Data

US 2023/0350544 A1 Nov. 2, 2023

(30) Foreign Application Priority Data

Apr. 29, 2022 (TW) .................................. 111116316

(51) Int. Cl.
  *G06F 3/0482* (2013.01)
  *G06F 3/04817* (2022.01)
  *G06F 3/0488* (2022.01)
  *G06F 16/9535* (2019.01)
  *H04L 51/216* (2022.01)

(52) U.S. Cl.
  CPC ........ *G06F 3/0482* (2013.01); *G06F 3/04817* (2013.01); *G06F 3/0488* (2013.01); *G06F 16/9535* (2019.01); *H04L 51/216* (2022.05)

(58) Field of Classification Search
  CPC .. G06F 3/0482; G06F 3/04817; G06F 3/0488; G06F 16/9535; G06F 16/9538; G06F 16/9537; H04L 51/216; G06Q 50/10
  See application file for complete search history.

(56) References Cited

U.S. PATENT DOCUMENTS

| 10,963,529 | B1 * | 3/2021 | Amitay | .................. H04W 4/02 |
| 2015/0334077 | A1 | 11/2015 | Feldman | |
| 2021/0319475 | A1 * | 10/2021 | Li | ......................... G06F 3/0481 |
| 2022/0327640 | A1 * | 10/2022 | Li | ......................... G06Q 50/01 |

FOREIGN PATENT DOCUMENTS

| CN | 112836136 A | | 5/2021 |
| KR | 20140113162 | * | 3/2013 |
| TW | 202209088 A | | 3/2022 |

* cited by examiner

*Primary Examiner* — Cao H Nguyen
(74) *Attorney, Agent, or Firm* — Li & Cai Intellectual Property Office (57) ABSTRACT

An adaptive discussion-topic system, an operating method thereof, and a non-transitory computer-readable recording medium are provided. The adaptive discussion-topic system includes a server having a discussion-topic database and a software program executed in a user device for initiating a graphical user interface. When the server receives a selection of one of discussion-topic categories displayed on a first layer discussion-topic page, the discussion-topic database is queried for rendering a second layer discussion-topic page. The second layer discussion-topic page is displayed on the graphical user interface initiated by the user device, in which multiple discussion-topic areas are displayed in a first direction, and multiple discussion-topic areas associated with a location attribute or multiple discussion-topic categories that relate to topics of the discussion-topic areas in the first direction and match with a personal preference of a user are displayed in a second direction.

13 Claims, 9 Drawing Sheets

ADAPTIVE DISCUSSION-TOPIC SYSTEM, OPERATING METHOD THEREOF, AND NON-TRANSITORY COMPUTER-READABLE RECORDING MEDIUM

CROSS-REFERENCE TO RELATED PATENT APPLICATION

This application claims the benefit of priority to Taiwan Patent Application No. 111116316, filed on Apr. 29, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system for providing discussion topics, and more particularly to a system that is used to provide a graphical user interface including location-related discussion topics, an operating method, and a non-transitory computer-readable recording medium.

BACKGROUND OF THE DISCLOSURE

Currently, the Internet has become a major source from which a user can acquire information. Many search engines are provided on the Internet to allow the user to easily look up information by using keywords. When any person wants to search for an answer or find a discussion on a specific issue, the person can submit a discussion topic to a network forum for acquiring opinions from other people who are interested in the issue and join the discussion.

A conventional network forum or a conventional service for providing discussion topics is operated based on the discussion topics submitted by many users. However, such discussion topics are generally unitary and lack diversity and locality. That is, since the discussion topics do not correlate with a location of the user, the conventional network forum or the conventional service is unable to recommend the discussion topics that match with interests of the user and are relevant to their location of interest. Moreover, the user can only use keywords to search the network forum, and fails to acquire the location-related discussion topics.

SUMMARY OF THE DISCLOSURE

In response to the above-referenced technical inadequacies (e.g., conventional discussion topics lack attributes of geographic locations, lack variety, or do not have the function to match with an interest of a user), the present disclosure provides an adaptive discussion-topic system, an operating method thereof, and a non-transitory computer-readable recording medium. The adaptive discussion-topic system is able to adaptively provide discussion topics according to a selection of the user and provide a novel operation interface.

In one aspect of the present disclosure, the adaptive discussion-topic system includes a server that includes a discussion-topic database and a software program executed in a user device. The software program is configured to initiate a graphical user interface.

The server provides the software program for the user device to initiate the graphical user interface for displaying a discussion-topic page. In one embodiment of the present disclosure, in the discussion-topic page, multiple discussion-topic areas corresponding to a discussion-topic category are displayed in a first direction. By the software program, it is determined whether or not a topic term of each of the discussion-topic areas in the first direction has a location attribute.

When the topic term of any of the discussion-topic areas in the first direction has the location attribute, the server provides related contents that form the multiple topic-discussion areas in a second direction associated with the location attribute of the topic term of any of the discussion-topic areas in the first direction. Alternatively, when the topic term of any of the discussion-topic areas in the first direction is determined not to have the location attribute, multiple discussion-topic categories that match with a personal preference of the user are displayed in the second direction.

Specifically, the discussion-topic page is a second layer discussion-topic page. A first layer discussion-topic page is further provided. When the server receives a selection of one of the discussion-topic categories displayed on the first layer discussion-topic page from the user device, the server queries the discussion-topic database according to the selected discussion-topic category for acquiring contents of the second layer discussion-topic page.

Preferably, the multiple discussion-topic areas corresponding to the discussion-topic category in the first direction have multiple location-related discussion topics that match with the personal preference of the user. The first direction can be a vertical direction, and the server allows the user to perform a vertical swipe gesture for browsing the discussion-topic areas corresponding to the selected discussion-topic category.

Further, when the server receives a selection of one of the discussion-topic areas in the first direction from the user device, a discussion content of the selected discussion-topic area is provided by querying the discussion-topic database, and the discussion content can be displayed on a discussion-topic dialogue page.

Still further, the server can continuously provide the discussion-topic areas that match with the personal preference of the user in response to the vertical swipe gesture performed by the user in the first direction. When running out of the discussion-topic areas, further discussion-topic areas that match with the personal preference of the user can be further provided based on a range of locations that gradually expands outward.

Preferably, the second direction can be a horizontal direction. The server allows the user to perform a horizontal swipe gesture to browse the discussion-topic areas associated with the location attribute, or to browse the discussion-topic categories that match with the personal preference of the user and relate to the topics of the discussion-topic areas but are not associated with the location attribute.

In one aspect of the present disclosure, a lookup table is one of the methods for determining whether or not the topic term of each of the discussion-topic areas in the first direction has the location attribute. The lookup table is provided for looking up the location attribute corresponding to the topic term.

In one further aspect of the present disclosure, the adaptive discussion-topic system provides a machine-learning algorithm to learn keywords with the location attribute, so as to establish an intelligent model. The intelligent model is used to determine whether or not the topic term of each of the discussion-topic areas in the first direction has the location attribute.

According to one embodiment of the present disclosure, the non-transitory computer-readable recording medium is used to store computer instructions that are executed in the user device to perform steps of establishing a connection with the server of the location-related discussion-topic system, loading contents from the server, and initiating the graphical user interface. The computer instructions implement a social media program.

In the user device, in response to the selection of one of the discussion-topic categories displayed on the first layer discussion-topic page, the second layer discussion-topic page is formed and displayed on the graphical user interface. On the second layer discussion-topic page, a result is generated by the server through querying the discussion-topic database according to the selection of one of the discussion-topic categories. The multiple discussion-topic areas corresponding to the selected discussion-topic category are displayed in the first direction. If the topic term of any of the discussion-topic areas has the location attribute, the multiple discussion-topic areas associated with the location attribute can be displayed in the second direction. Alternatively, if none of the topic terms of the discussion-topic areas in the first direction has the location attribute, multiple discussion-topic categories that match with the personal preference and relate to the topic of any of the discussion-topic areas in the first direction are displayed in the second direction.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure relates to an adaptive discussion-topic system, an operating method thereof, and a non-transitory computer-readable recording medium. One of the objectives of the adaptive discussion-topic system is to allow a user to select a location-related discussion topic via a graphical user interface. Apart from using a keyword to search the discussion topic or obtaining a topic of interest from a network forum subscribed by the user, the adaptive discussion-topic system particularly allows the user to acquire the location-related discussion topic or to create a discussion topic relating the location when browsing contents of different areas, countries, or cities. Further, the adaptive discussion-topic system designs the graphical user interface for browsing the location-related discussion topics by a software means. Therefore, the user can use a user device (such as a mobile phone, a tablet computer, or a personal computer) to browse location-related discussion-topic areas in various categories, which include the discussion topics that the adaptive discussion-topic system recommends to the user, i.e., the location-related discussion topics or the discussion topics that match with a personal preference of the user.

Figure 1:
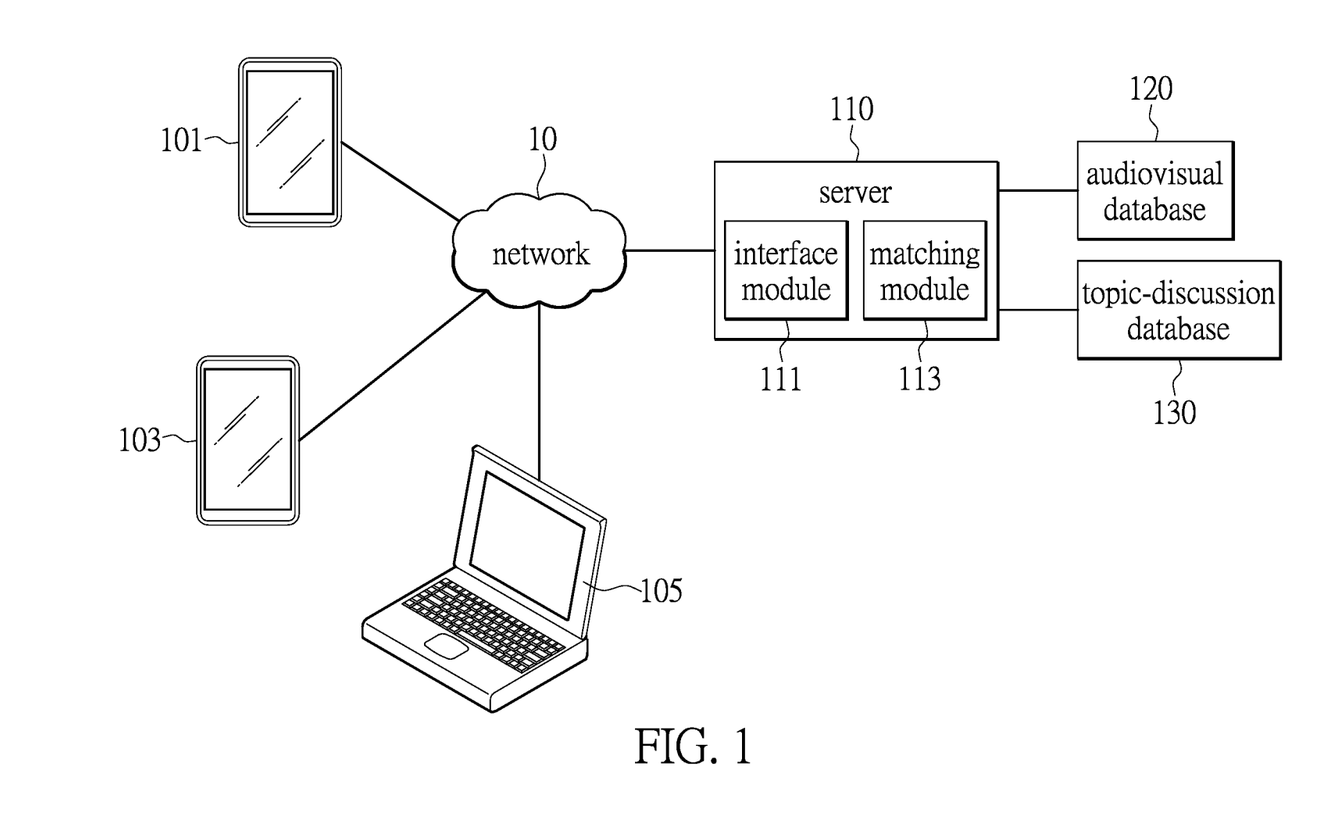
FIG. 1 is a schematic diagram depicting a framework of an adaptive discussion-topic system according to one embodiment of the present disclosure.

FIG. 1 is a schematic diagram depicting a framework of the adaptive discussion-topic system according to one embodiment of the present disclosure. The adaptive discussion-topic system is operated via a server 110. In one aspect of the present disclosure, the server 110 includes an interface module 111 that provides user devices 101, 103 and 105 a webpage or a software program to initiate a user interface for displaying a location-related discussion topic. The server 110 provides a matching module 113 to match contents in a database according to location data transmitted by the user devices 101, 103 and 105. The contents in the database are, for example, audiovisual contents and discussion topics. The server 110 can also match the contents in the database according to the personal preference of the user, so as to obtain the contents that match with the personal preference.

The server 110 utilizes a database technology to implement an audiovisual database 120 and a discussion-topic database 130. According to one embodiment of the present disclosure, when the server 110 receives the location data from any of the user devices 101, 103 and 105 via a network 10, a software sequence operated in the server 110 is configured to query the discussion-topic database 130 according to the location data, so as to obtain one or more location-related discussion topics within a geographic range. Further, one or more location-related discussion-topic linking icons corresponding to the location-related discussion topics can be obtained and transmitted to the user devices 101, 103 and 105. The one or more location-related discussion-topic linking icons can be marked on a graphical user interface initiated in each of the user devices 101, 103 and 105.

In addition to providing the location-related discussion topics, when the server 110 receives the location data from the user devices 101, 103 and 105, the audiovisual database 120 is queried according to the location data, so as to obtain one or more location-related audiovisual contents within the geographic range. Similarly, the corresponding one or more location-related audiovisual linking icons can be provided to the user devices 101, 103 and 105. Thus, by the software program running in any one of the user devices, the user interface to be initiated can be a graphical user interface that uses an electronic map as a background. One or more location-related discussion-topic linking icons and one or more audiovisual linking icons can be marked on the user interface at the same time. The server 110 achieves a service of providing the location-related discussion topics and the audiovisual contents. Further, the server 110 allows the user to arbitrarily adjust the geographic range, so as to view the various contents on the user interface. The server 110 can also transmit the linking icons to the user device for being marked on the user interface.

By a software sequence running in the server 110, an algorithm is performed to not only record behaviors (e.g., commenting, liking, following, and sharing a specific discussion topic) of the user but also calculate areas (e.g., cities, countries, attractions, and landmarks) of interest to the user and the discussion topics that the user is interested in. The users can be grouped, so that the server 110 can effectively recommend each of the users the discussion topics that match with the personal preference of the user within the area of interest for the user. Furthermore, popular topics in the area of interest for each of the groups can also be obtained.

Figure 2:
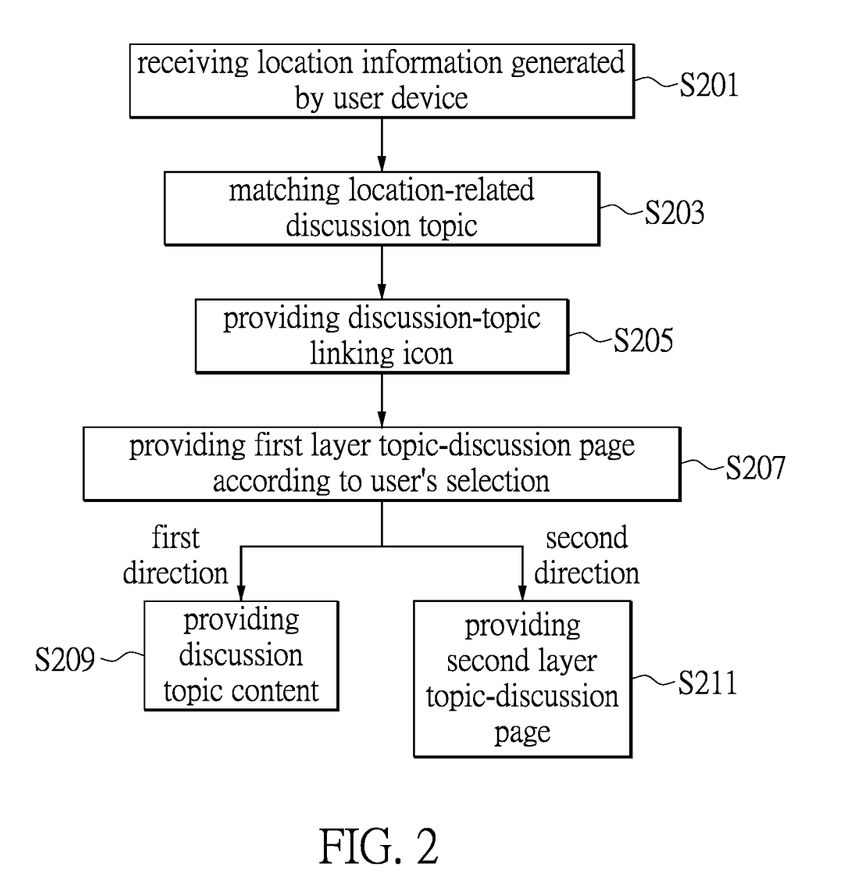
FIG. 2 is a flowchart illustrating an operating method of the adaptive discussion-topic system according to one embodiment of the present disclosure.
Figure 3:
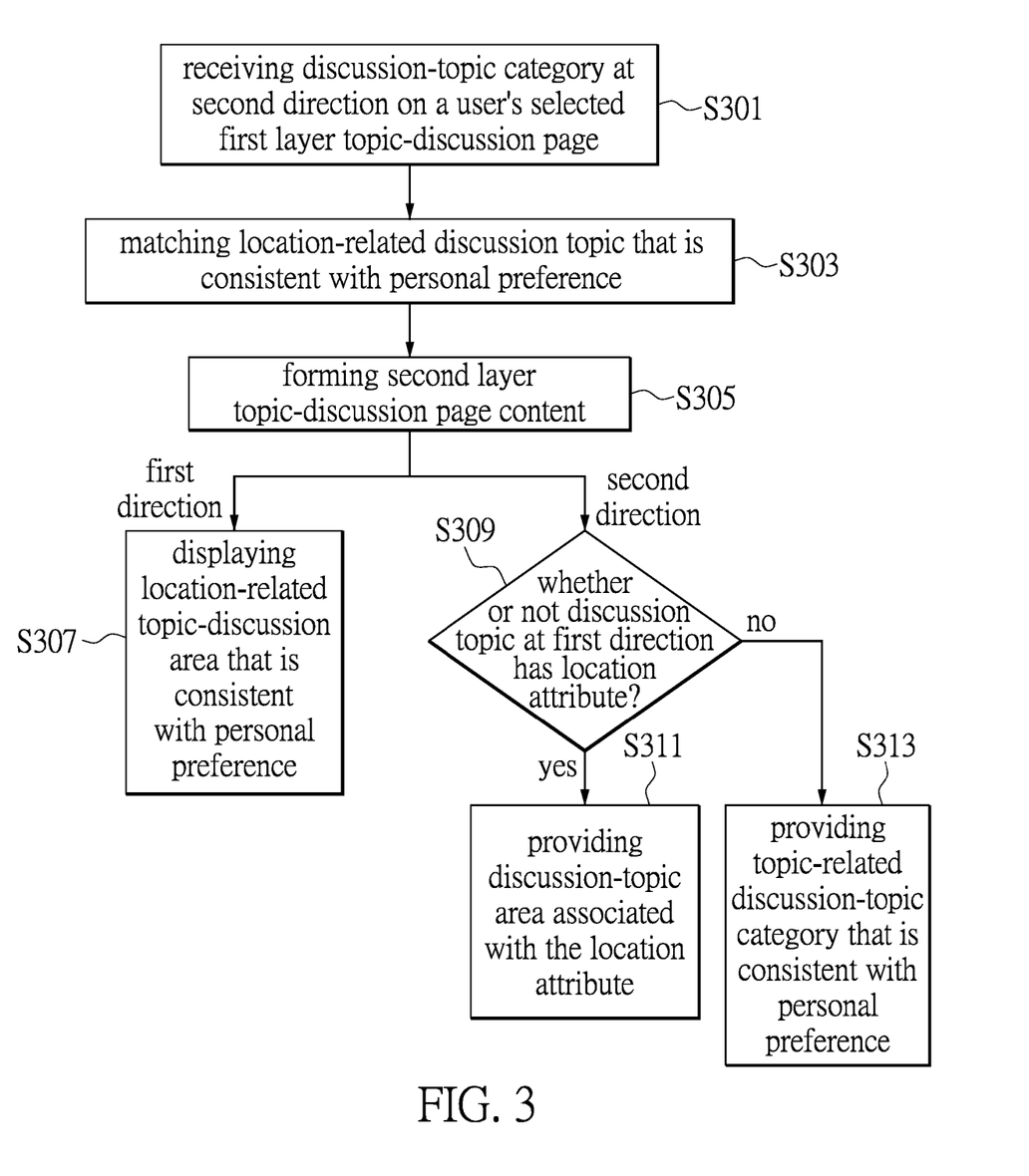
FIG. 3 is a flowchart illustrating a process of providing a graphical user interface for displaying a second layer discussion-topic page in the adaptive discussion-topic system according to one embodiment of the present disclosure.
Figure 4:
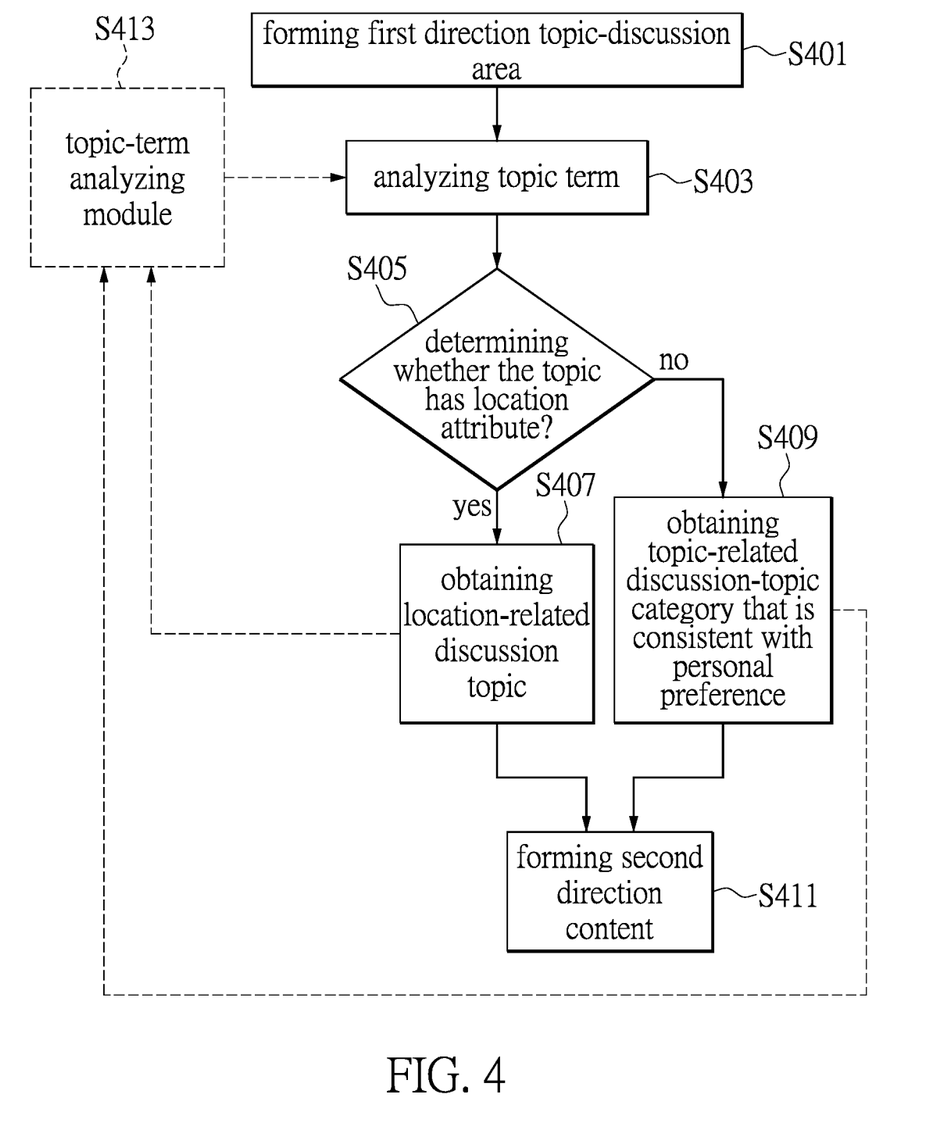
FIG. 4 is a flowchart illustrating the process of providing the graphical user interface for displaying the second layer discussion-topic page in the adaptive discussion-topic system according to another embodiment of the present disclosure.

FIG. 2 to FIG. 4 are each a flowchart illustrating a software process of operating the server. Computer instructions are executed in the user device. These computer instructions stored in the non-transitory computer-readable recording medium can be performed in the user device to connect with a server of the adaptive discussion-topic system, load contents (such as the discussion topics and the audiovisual contents), and initiate the graphical user interface. Thus, the server can provide to the user device the location-related discussion topics that can be required to match with the personal preference of the user. The contents to be provided to the user device can also be the discussion-topic categories that are determined by the server according to attributes of the topics. References are made to FIG. 5 to FIG. 9, which schematically show the graphical user interfaces during the progress of the operating method according to the present disclosure.

Figure 5:
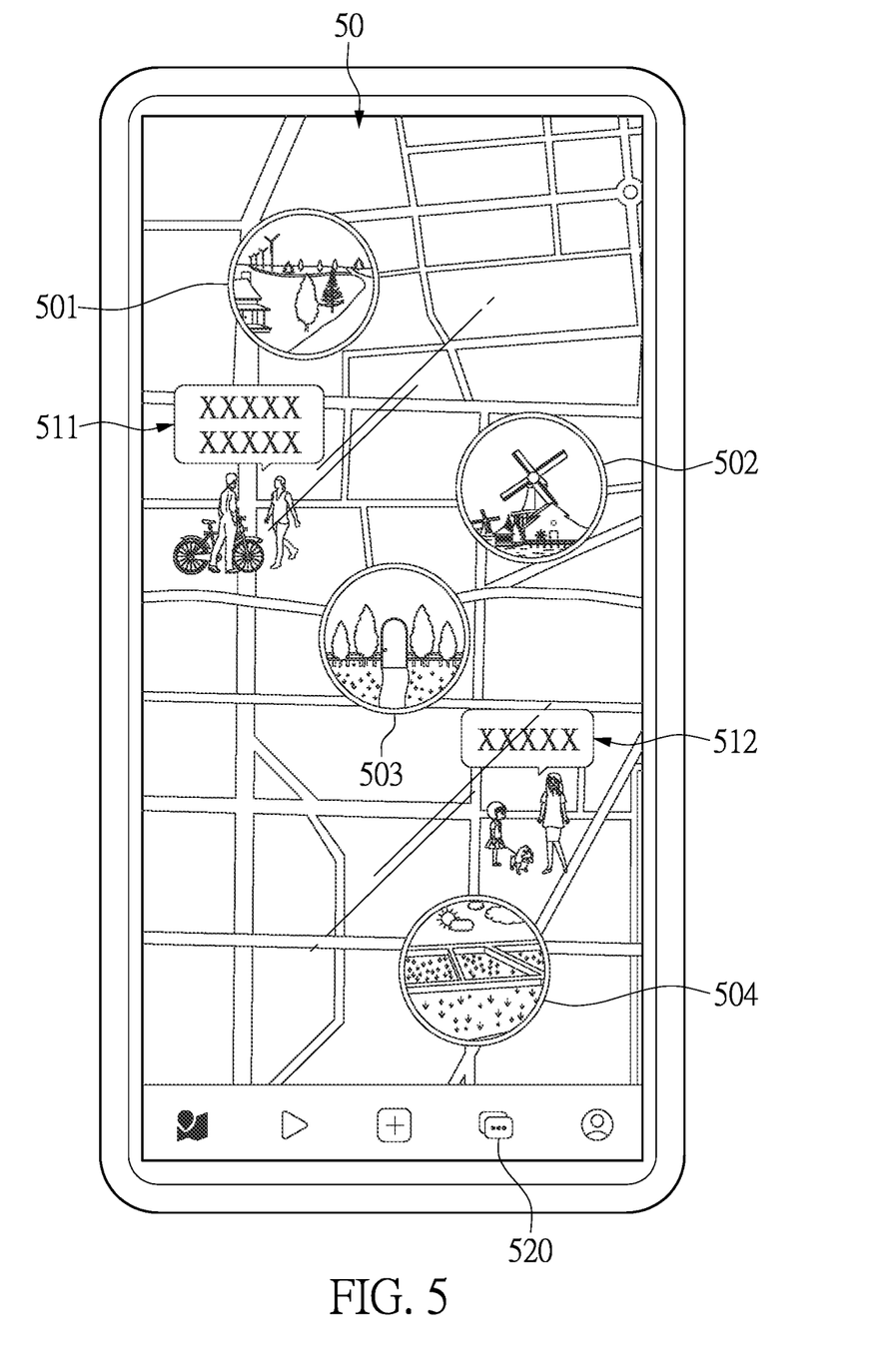
FIG. 5 is a schematic diagram illustrating a front page provided by the adaptive discussion-topic system according to one embodiment of the present disclosure.

The computer instructions executed in the user device implement a social media program. In one embodiment of the present disclosure, in the beginning, an electronic-map-based social media program is executed in the user device. In another aspect of the present disclosure, the social media program can be presented by a social media webpage that is provided by the server. After the social media program is executed, a graphical user interface is initiated, and a front page is entered. On the front page, a map interface is displayed. Preferably, reference can be made to a schematic diagram of the front page provided by the adaptive discussion-topic system as shown in FIG. 5. In the present example, an electronic map 50 is shown. Various linking icons, such as a plurality of audiovisual linking icons 501, 502, 503, and 504 and a plurality of discussion-topic linking icons 511 and 512, are marked at different locations of the electronic map 50. A number and a displaying state of these linking icons should not be taken as limiting the scope of the present disclosure.

Further, as shown in FIG. 5, a main page includes the various linking icons and several function buttons (which are used to assist the user to browse the location-related contents) shown at the bottom of the page. For example, the function buttons allow the user to position a current location of the user, to play all the audiovisual contents on the currently-browsed page, to add a location-based audiovisual content, to maintain a user profile, etc. Furthermore, the adaptive discussion-topic system allows the user to add a new discussion topic via an adding-new-discussion-topic link 520 displayed on the current page. When the user adds a new location-related discussion topic via the adding-new-discussion-topic link 520, said discussion topic is uploaded to the discussion-topic database of the server. The discussion topic is at least associated with location data, user data and a discussion topic category that are also recorded into the discussion-topic database.

When entering the front page as the social media program is executed in the user device, the location data is generated and transmitted to the server (step S201). The location data can be a geographic range. For example, a graphical user interface is initiated on a touch-sensitive display of the user device. The user can perform a zoom-in gesture, a zoom-out gesture, or a moving gesture on the graphical user interface for browsing contents, such that a display area is formed. In this way, the geographic range can be obtained. According to the location data, a matching module that is implemented by software of the server can query the discussion-topic database for obtaining one or more location-related discussion topics within the geographic range, and also obtaining one or more location-related audiovisual contents within the geographic range (step S203). In the meantime, one or more location-related discussion-topic linking icons corresponding to the one or more location-related discussion topics are also provided. Similarly, one or more audiovisual linking icons can also be obtained. These linking icons are provided to the user device via a network (step S205).

It should be noted that the location-related discussion topics can be established by many users via the server. The location-related discussion topic can be a topic related to a geographic location. The location-related audiovisual contents can be uploaded to the server by many users via the network. The audiovisual content can be an image or a video of a location, an attraction, or a landmark.

The user can browse the one or more location-related discussion topics and/or audiovisual contents within the geographic range via the graphical user interface. The user can select one of the location-related discussion-topic linking icons. The server provides a first layer discussion-topic page according to such a selection. The contents on the first layer discussion-topic page are the contents relating to the selected discussion topic. Referring to an exemplary example shown in FIG. 6, multiple discussion-topic areas that are sorted by popularity are shown in a first direction, and multiple location-related discussion-topic categories that match with the personal preference of the user are shown in a second direction (step S207).

Figure 6:
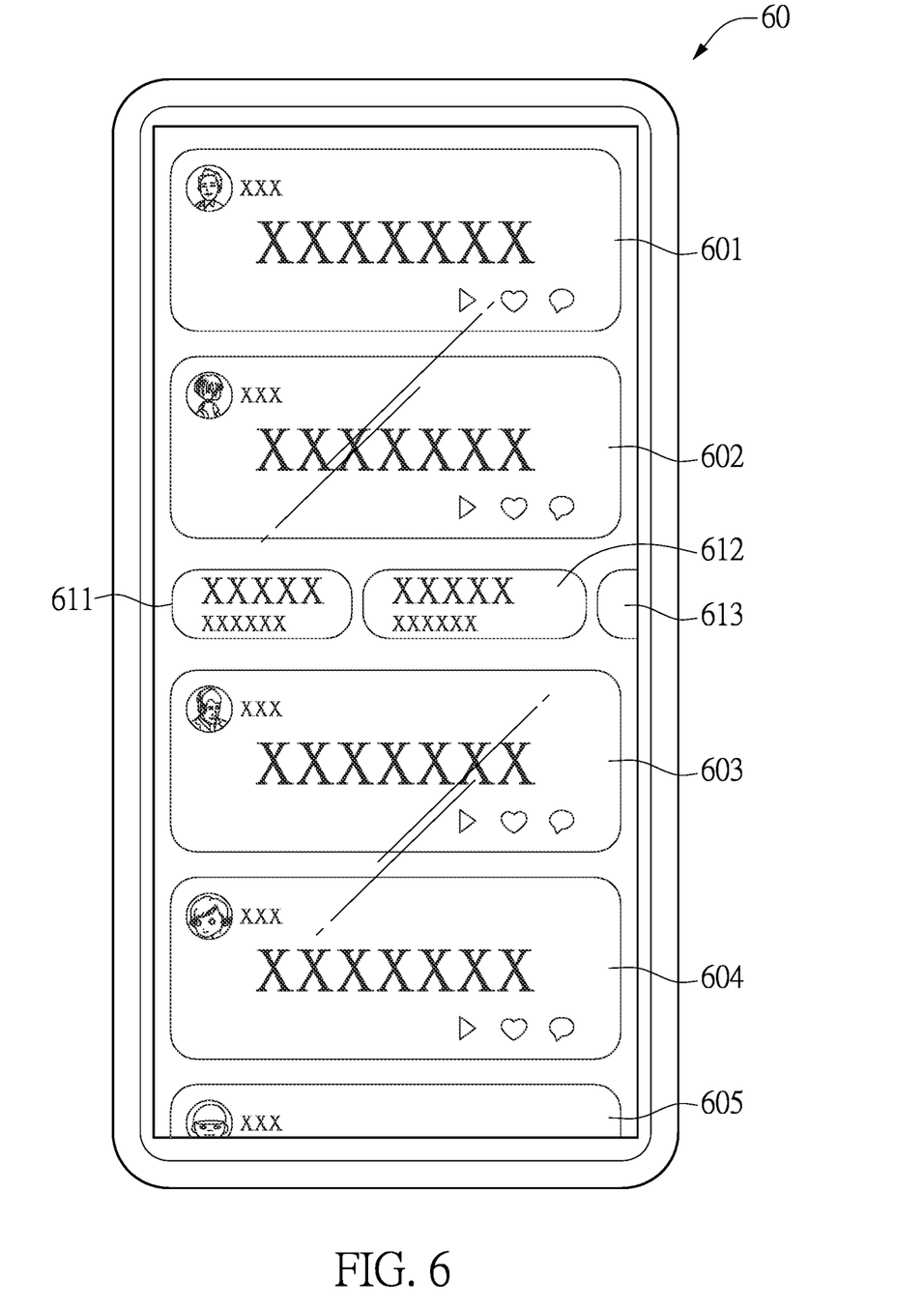
FIG. 6 is a schematic diagram illustrating a first layer discussion-topic page provided by the adaptive discussion-topic system according to one embodiment of the present disclosure.

Reference is made to FIG. 6, which illustrates an exemplary example of a first layer discussion-topic page 60 shown on a graphical user interface initiated in a mobile device. In the diagram, the first direction can be a vertical direction, and the second direction can be a horizontal direction. Multiple discussion-topic areas 601, 602, 603, 604, and 605 are shown in the vertical direction. The present example shows that several discussion-topic categories 611, 612, and 613 are shown in a horizontal direction between the two discussion-topic areas 602 and 603. For any of the discussion-topic areas 601, 602, 603, 604, and 605 or the discussion-topic categories 611, 612, and 613, the adaptive discussion-topic system allows the user to participate, like, follow, or share through various buttons.

According to one embodiment of the present disclosure, the discussion-topic areas 601, 602, 603, 604, and 605 shown in the first direction can be location-related discussion-topic areas that are sorted by popularity. The user of the user device can perform a vertical swipe gesture to browse the one or more discussion-topic areas that are sorted by popularity in the vertical direction. The discussion-topic categories 611, 612, and 613 shown in the second direction can be the location-based discussion-topic categories that match with the personal preference of the user.

Further, after the server matches the discussion topics in the discussion-topic database, the discussion-topic areas 601, 602, 603, 604, and 605 are shown in the first direction. However, when the user continuously performs the vertical swipe gesture along the first direction until the page runs out of content, the adaptive discussion-topic system can continuously provide the discussion-topic areas within other geographic ranges that are different from the original browsed location.

It should be noted that, according to the above embodiment, the adaptive discussion-topic system provides multiple sorted discussion-topic areas in the first direction, and an order that the discussion topics are shown is based on the popularity of each of the discussion topics. The popularity of the discussion topic can be calculated based on dwell time, a number of likes, and/or the personal preference of the user for the discussion topic. These factors can be referred to for calculating the popularity of each of the discussion topics. According to one embodiment of an algorithm adopted by the adaptive discussion-topic system, the preferred discussion topic can be determined based on a number of users who like, share, comment, and/or follow a specific discussion topic. The calculation of following the specific discussion topic includes the user following but not commenting or liking the discussion topic, and a number of times that the discussion topic is seen by all the users. In addition, the dwell time is also taken into consideration. For example, dwell time can be taken in this context to represent that a discussion topic is counted as being followed by a user only when the user stays in the discussion topic for more than a specific length of time, e.g., seven seconds.

The personal preference of the user is determined based on comments made by the user, a staying time, and interests (such as the acts of likes, shares, comments, and/or following) of the user. Accordingly, the personal preference of the user can be generated and then used for matching the discussion topics that are consistent with the personal preference of the user.

Similarly, the various discussion-topic categories 611, 612 and 613 can be shown in the second direction in response to a horizontal swipe gesture performed by the user. The server can continuously provide the location-based discussion-topic categories that match with the personal preference of the user. However, the content provided by the server may be exhausted. Therefore, the contents provided by the server can expand outward from the original location linked to the selected location-related discussion topic to other locations, so that the server can continuously provide more location-related discussion-topic categories. Further, according to one further embodiment, when the location-related discussion-topic categories provided by the server run out, the server actively switches to another discussion-topic category.

Figure 7:
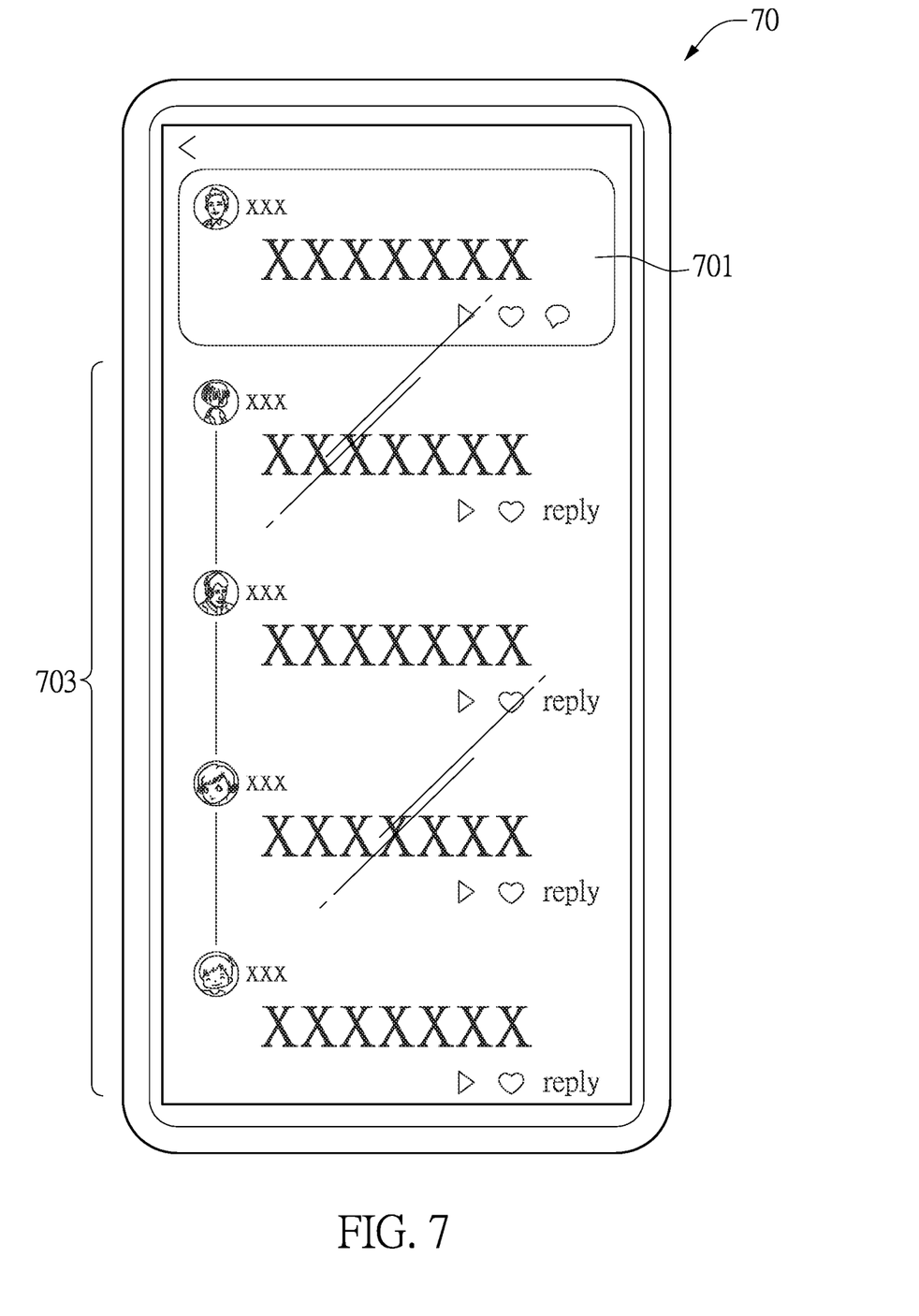
FIG. 7 is a schematic diagram illustrating a discussion-topic dialogue page provided by the adaptive discussion-topic system according to one embodiment of the present disclosure.

After that, when the user selects one of the discussion-topic areas in the first direction using the touch-sensitive display or other input methods, the server provides the content of the selected discussion topic (step S209). Reference is made to FIG. 7, which is a schematic diagram of a discussion-topic dialogue page provided by the adaptive discussion-topic system according to one embodiment of the present disclosure. When the server receives a selection of the one of the discussion-topic areas in the first direction from the user device, the server queries the discussion-topic database to provide a discussion content corresponding to the selected discussion-topic area. The discussion content is displayed on a discussion-topic dialogue page 70 shown in FIG. 7, and one or more discussion topics 701 and relevant discussion contents 703 are displayed on the discussion-topic dialogue page 70.

Figure 8:
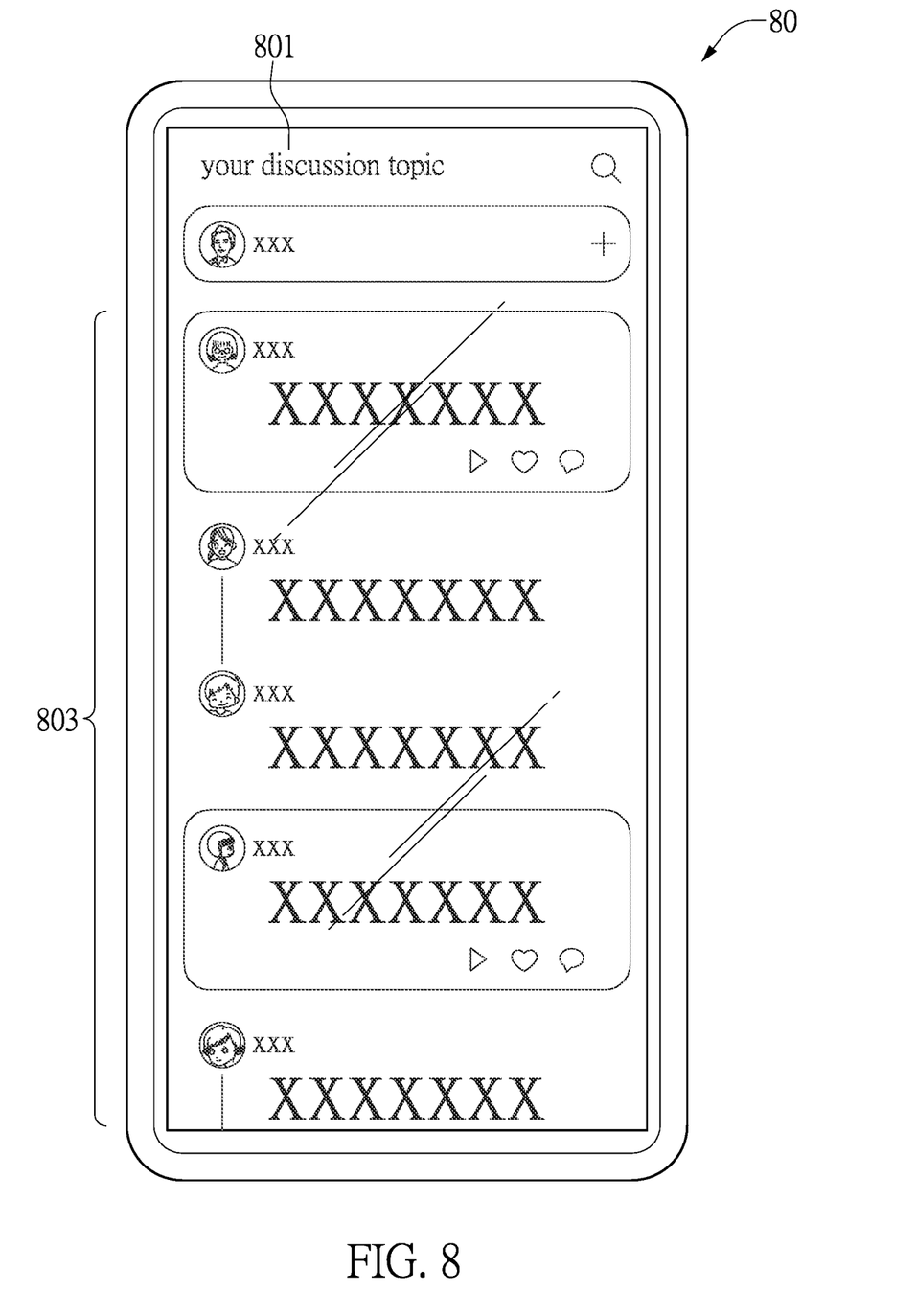
FIG. 8 is a schematic diagram illustrating a user-related discussion-topic page provided by the adaptive discussion-topic system according to one embodiment of the present disclosure.

Referring to FIG. 8, a schematic diagram illustrating a user-related discussion-topic page provided by the adaptive discussion-topic system is shown. The user can browse a discussion-topic page 80 having various discussion topics via the graphical user interface, on which some current discussion topics 803 are shown at the bottom of the discussion-topic page 80. When the user finishes the activities (e.g., commenting, liking, or following) on the first layer discussion-topic page, a user-related discussion-topic button 801 can be used to quickly return to a previous discussion-topic area that the user had joined before.

On the other hand, when the user manipulates the touch-sensitive display or other input methods to select one of the discussion-topic categories in the second direction, the server receives a selection of the one of the discussion-topic categories from the user device, and queries the discussion-topic database to provide a second layer discussion-topic page (step S211).

FIG. 3 is a flowchart illustrating a process of forming the second layer discussion-topic page according to one embodiment of the present disclosure. When the user selects one of the discussion-topic categories in the second direction on the first layer discussion-topic page, a selection signal is generated, and the server receives the selection signal from the user device via the network (step S301). The server then queries the discussion-topic database according to the selected discussion-topic category for matching the location-related discussion topic that matches with the personal preference of the user. The contents in both the first direction and the second direction on the second layer discussion-topic page are provided (step S303), so as to form the contents on the second layer discussion-topic page (step S305).

Figure 9:
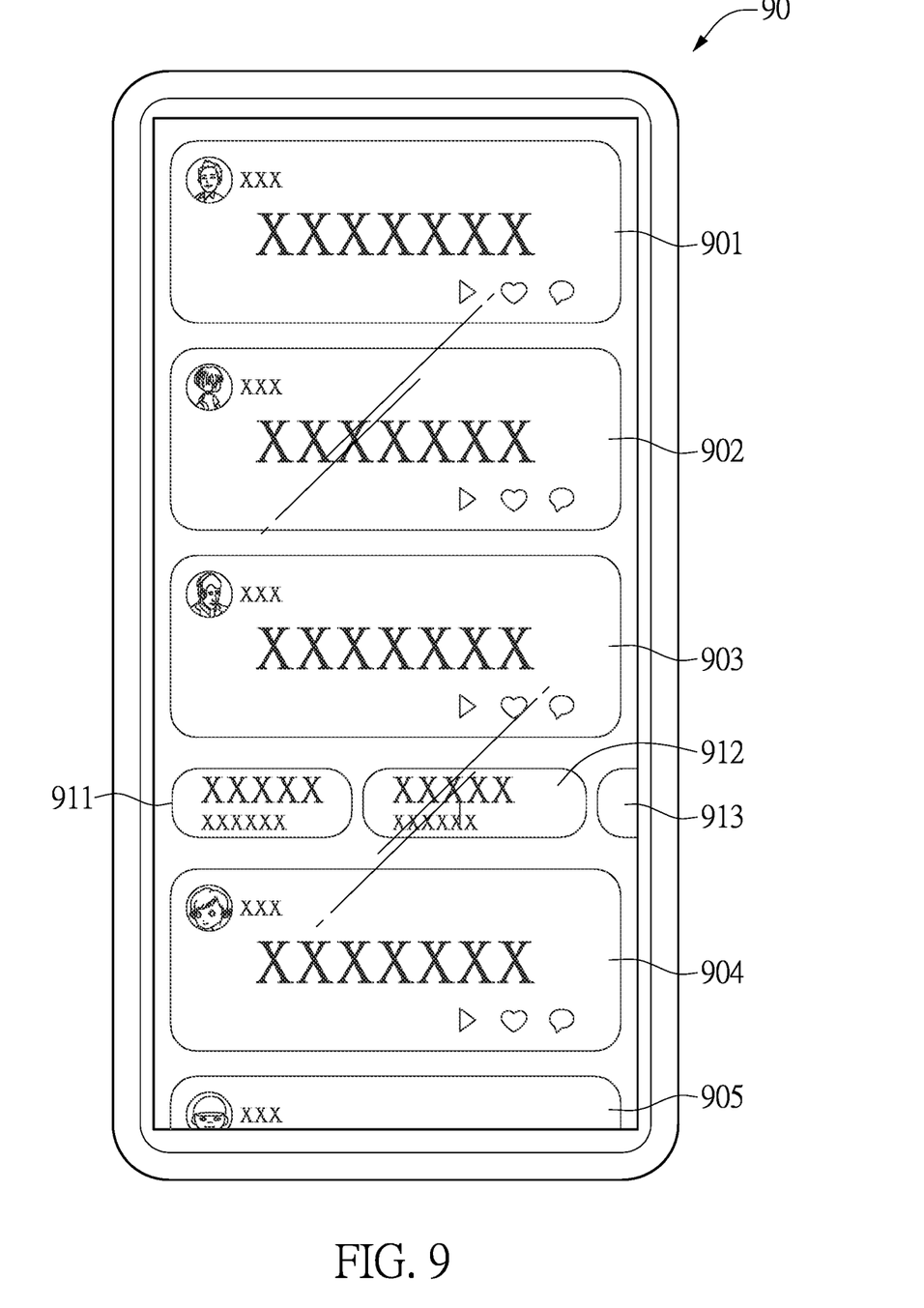
FIG. 9 is a schematic diagram illustrating the second layer discussion-topic page provided by the adaptive discussion-topic system according to one embodiment of the present disclosure.

A software program executed in the user device initiates the graphical user interface that is used to display the second layer discussion-topic page. Reference is made to FIG. 9, which is an exemplary example of the user interface. A second layer discussion-topic page 90 is shown in the diagram, and the discussion topics are shown in two directions. The two directions include a first direction (e.g., a vertical direction) that is used to display one or more location-related first direction discussion-topic areas 901, 902, 903, 904, and 905 that also match with the personal preference of the user (step S307), and a second direction (e.g., a horizontal direction) that is used to display the discussion topic contents that form the contents in the second direction. The contents provided to be shown in the second direction may depend on whether or not any of the discussion topics shown in the first direction has a location attribute.

In the process of forming the second layer discussion-topic page, a software sequence operated in the server determines whether or not any of the discussion topics in the one or more discussion-topic areas in the first direction has the location attribute (step S309). When any of topic terms of the discussion-topic areas in the first direction has the location attribute, multiple location-related discussion-topic areas are shown in the second direction on the second layer discussion-topic page (step S311), e.g., the second direction discussion-topic areas 911, 912, and 913 shown in FIG. 9. Otherwise, when any of the topic terms of the discussion-topic areas in the first direction does not have the location attribute, multiple discussion-topic categories that match with the personal preference and relate to the topic of any of the discussion-topic areas in the first direction are shown in the second direction (step S313). Similarly, on the second layer discussion-topic page, if the location-related discussion topics that match with the personal preference of the user in the first direction of the discussion-topic area run out, the geographic range in which the discussion-topic areas are shown gradually expands outward. If the discussion-topic areas that match with the personal preference of the user also run out, the discussion-topic areas relating to other discussion-topic categories in the second direction of the first layer discussion-topic page can be continuously displayed.

According to the above process, the server provides the contents in both of the first direction and the second direction on the second layer discussion-topic page. When the user clicks on (e.g., performing a vertical swipe gesture to browse and make a selection) one of the discussion-topic areas in the first direction, the server queries a database for obtaining the corresponding discussion contents. A discussion-topic page relating to a specific discussion topic is shown on the user device. Similarly, reference can be made to FIG. 7, which schematically shows the discussion-topic dialogue page according to one embodiment of the present disclosure. On the other hand, when the user clicks on (e.g., performing a horizontal swipe gesture to browse and make a selection) one of the location-based discussion-topic areas, a discussion-topic page is entered. Alternatively, when the user selects the location-related discussion-topic category that does not have location attribute, the server queries the database for acquiring the contents to be shown on the second layer discussion-topic page (which is displayed on the graphical user interface initiated in the user device). At this time, the discussion-topic areas displayed in the first direction are also related to the selected discussion-topic category.

The contents displayed in the second direction are provided by the adaptive discussion-topic system depending on whether or not the discussion topic displayed in the first direction of the second layer discussion-topic page has the location attribute. Reference is made to the flowchart shown in FIG. 4.

When the second layer discussion-topic page is formed, one or more discussion-topic areas relating to the discussion-topic category that is selected by the user are displayed in the first direction (step S401). At this time, a software sequence operated in the server parses the topic terms in the one or more discussion-topic areas along the first direction (step S403), so as to determine the content displayed in the second direction according to whether or not the topic terms have any location attribute.

The adaptive discussion-topic system achieves a topic-term analyzing module by means of software (step S413). The topic-term analyzing module is used to determine whether or not any discussion topic in the discussion-topic areas in the first direction has the location attribute (step S405). In an aspect of the present disclosure, a lookup table is provided in the server. The lookup table records various topic terms and their corresponding location attributes (if any). By looking up the lookup table, it can be determined whether or not the topic term of each of the discussion-topic areas in the first direction has the location attribute. In one further aspect of the present disclosure, the adaptive discussion-topic system incorporates a machine-learning algorithm to learn the keywords with the location attribute, so as to establish an intelligent model that is used to determine whether or not the topic term has the location attribute. When entering the second layer discussion-topic page, the adaptive discussion-topic system can use the intelligent model to determine whether or not the topic term of each of the discussion-topic areas in the first direction has the location attribute.

When the topic-term analyzing module determines that the topic term of any of the discussion-topic areas in the first direction has the location attribute ("YES" shown in the flowchart), the server then queries the discussion-topic database for acquiring one or more location-related discussion topics (step S407) that form the contents in the second direction (step S411). Otherwise, when the topic-term analyzing module determines that there is no topic term of any of the discussion-topic areas in the first direction having the location attribute ("NO" shown in the flowchart), the server acquires the discussion-topic category that matches the discussion topic and the personal preference (step S409), and similarly forms the contents in the second direction (step S411).

It should be noted that, regardless of how the various topic terms are determined to have the location attribute or not, the adaptive discussion-topic system incorporates a human-supervised machine-learning algorithm to establish or continuously optimize the intelligent model. Accordingly, the topic-term analyzing module can be achieved, as shown in step S413 of FIG. 4.

In an exemplary example, when a user clicks on a location-based discussion-topic linking icon that associates with a National Basketball Association (NBA) discussion topic on an electronic-map-based graphical user interface initiated by a social media program, a first layer discussion-topic page that includes multiple location-related NBA discussion-topic areas shown in a first direction is entered. The location-related NBA discussion-topic areas can be sorted by popularity. In a second direction, multiple NBA-related discussion-topic categories that match with a personal preference of the user are provided. Furthermore, when the user selects one of the discussion-topic categories in the second direction on the first layer discussion-topic page, a second layer discussion-topic page is entered. For example, multiple NBA-related discussion-topic areas about a basketball player (e.g., LeBron James from the Los Angeles Lakers) that matches with the personal preference are shown in the first direction. Since the topic term, i.e., Los Angeles, of the discussion-topic area in the first direction has the location attribute, the multiple location-related discussion-topic areas that are related to the City of Los Angeles in the second direction are provided. When the user performs a horizontal swipe gesture to browse the discussion-topic areas about Los Angeles in the second direction, if the original discussion topics about the City of Los Angeles provided by the server are exhausted, the server may provide more discussion topics expanding outward to the State of California.

In conclusion, in the adaptive discussion-topic system, the operating method thereof, and the non-transitory computer-readable recording medium provided by the present disclosure, by means of software, the adaptive discussion-topic system provides location-related discussion topics that the user is interested in via the user device. The adaptive discussion-topic system can group the users, and one of the objectives is to recommend each of the users the discussion topics within the area of interest of the user. The computer instructions stored in the non-transitory computer-readable recording medium of the user device are provided. The computer instructions in the user device are executed for establishing a connection with the server, loading contents from the server, and initiating the graphical user interface that is configured to provide various selections of location-related discussion topics in different stages through the first layer discussion-topic page and the second layer discussion-topic page.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adaptive discussion-topic system, comprising:
a server having a discussion-topic database;
wherein the server allows a user device to display a discussion-topic page via a graphical user interface initiated by the user device;
wherein, on the discussion-topic page, multiple discussion-topic areas corresponding to a discussion-topic category are displayed in a first direction, and the server determines whether or not a topic term of each of the discussion-topic areas in the first direction has a location attribute; wherein, when the topic term of any of the discussion-topic areas in the first direction has the location attribute, the multiple discussion-topic areas associated with the location attribute are displayed in a second direction;
wherein the first direction is a vertical direction, and the server allows the user to perform a vertical swipe gesture to browse the multiple discussion-topic areas corresponding to the selected discussion-topic category; and, when the topic term of each of the discussion-topic areas in the first direction is determined to not have the location attribute, multiple discussion-topic categories that match with a personal preference of a user are displayed in the second direction that is a horizontal direction;
wherein the server allows the user to perform a horizontal swipe gesture to browse the multiple discussion-topic areas associated with the location attribute, or to browse the multiple discussion-topic categories that match with the personal preference of the user and relate to the topic of each of the discussion-topic areas but are not associated with the location attribute.

2. The adaptive discussion-topic system according to claim 1, wherein the discussion-topic page is a second layer discussion-topic page; wherein, when the server receives a selection of one of the discussion-topic categories on a first layer discussion-topic page from the user device, the discussion-topic database is queried according to the selected discussion-topic category, so as to obtain contents of the second layer discussion-topic page.

3. The adaptive discussion-topic system according to claim 2, wherein a process of forming the first layer discussion-topic page includes:
providing, by the server, one or more location-related discussion-topic linking icons corresponding to one or more location-related discussion topics within a geographic range to the user device according to the personal preference of a user, so as to mark the one or more location-related discussion-topic linking icons on the graphical user interface initiated in the user device;
receiving, by the server, a selection of one of the location-related discussion-topic linking icons from the user device, querying the discussion-topic database, and providing contents of the first layer discussion-topic page, wherein the contents include multiple discussion-topic areas that are sorted by popularity, and the multiple location-based discussion-topic categories that match with the personal preference of the user.

4. The adaptive discussion-topic system according to claim 1, wherein the server continuously provides location-related discussion-topic areas that match with the personal preference of the user in response to the vertical swipe gesture in the first direction; wherein, when the multiple discussion-topic areas run out, more location-related discussion-topic areas that match with the personal preference of the user are provided based on a range of location that gradually expands outward.

5. The adaptive discussion-topic system according to claim 1, wherein a machine-learning algorithm is provided for learning keywords with the location attribute, so as to establish an intelligent model for determining whether or not the topic term of each of the discussion-topic areas in the first direction has the location attribute.

6. An operating method of an adaptive discussion-topic system, which is operated in a server that includes a discussion-topic database, the operating method comprising:
    querying the discussion-topic database according to a selected discussion-topic category, so as to obtain multiple discussion-topic areas corresponding to the selected discussion-topic category and form a graphical user interface initiated by a user device for displaying a discussion-topic page;
    wherein, on the discussion-topic page, the multiple discussion-topic areas corresponding to the discussion-topic category are displayed in a first direction, and the server determines whether or not a topic term of each of the discussion-topic areas in the first direction has a location attribute; wherein, when the topic term of any of the discussion-topic areas in the first direction has the location attribute, the multiple discussion-topic areas associated with the location attribute are displayed in a second direction;
    wherein the first direction is a vertical direction, and the server allows the user to perform a vertical swipe gesture to browse the multiple discussion-topic areas corresponding to the selected discussion-topic category; and, when the topic term of each of the discussion-topic areas in the first direction is determined to not have the location attribute, multiple discussion-topic categories that match with a personal preference of a user are displayed in the second direction that is a horizontal direction;
    wherein the server allows the user to perform a horizontal swipe gesture to browse the multiple discussion-topic areas associated with the location attribute, or to browse the multiple discussion-topic categories that match with the personal preference of the user and relate to the topic of each of the discussion-topic areas but are not associated with the location attribute.

7. The operating method according to claim 6, wherein the discussion-topic page is a second layer discussion-topic page; wherein, when the server receives a selection of one of the discussion-topic categories on a first layer discussion-topic page from the user device, the discussion-topic database is queried according to the selected discussion-topic category so as to obtain contents of the second layer discussion-topic page.

8. The operating method according to claim 6, wherein the server continuously provides location-related discussion-topic areas that match with the personal preference of the user in response to the vertical swipe gesture in the first direction; wherein, when the multiple discussion-topic areas run out, more location-related discussion-topic areas that match with the personal preference of the user are provided based on a range of location that gradually expands outward.

9. The operating method according to claim 6, wherein, when the topic term of any of the discussion-topic areas in the first direction is determined to not have the location attribute, multiple discussion-topic categories that match with the personal preference of a user are displayed in the second direction.

10. The operating method according to claim 6, wherein, a machine-learning algorithm is provided for learning keywords with the location attribute, so as to establish an intelligent model for determining whether or not the topic term of each of the discussion-topic areas in the first direction has the location attribute.

11. A non-transitory computer-readable recording medium, characterized in that the non-transitory computer-readable recording medium stores computer instructions that are executed for connecting with a server of a location-related discussion-topic system, loading contents from the server, and initiating a graphical user interface, and the computer instructions are executed in a user device for performing steps of:
    displaying a discussion-topic page that is formed based on a discussion-topic category on the graphical user interface; and
    displaying, on the discussion-topic page, a result obtained by the server querying a discussion-topic database according to the discussion-topic category, wherein multiple discussion-topic areas are displayed in a first direction, and the server determines whether or not a topic term of each of the discussion-topic areas in the first direction has a location attribute; wherein, when the topic term of any of the discussion-topic areas in the first direction has the location attribute, the multiple discussion-topic areas associated with the location attribute are displayed in a second direction;
    wherein the first direction is a vertical direction, and the server allows the user to perform a vertical swipe gesture to browse the multiple discussion-topic areas corresponding to the selected discussion-topic category; and, when the topic term of each of the discussion-topic areas in the first direction is determined to not have the location attribute, multiple discussion-topic categories that match with a personal preference of a user are displayed in the second direction that is a horizontal direction;
    wherein the server allows the user to perform a horizontal swipe gesture to browse the multiple discussion-topic areas associated with the location attribute, or to browse the multiple discussion-topic categories that match with the personal preference of the user and relate to the topic of each of the discussion-topic areas but are not associated with the location attribute.

12. The non-transitory computer-readable recording medium according to claim 11, wherein the discussion-topic page is a second layer discussion-topic page;
    wherein, when the server receives a selection of one of the discussion-topic categories on a first layer discussion-topic page from the user device, the discussion-topic database is queried according to the selected discussion-topic category, so as to obtain contents on the second layer discussion-topic page.

13. The non-transitory computer-readable recording medium according to claim 11, wherein the server continuously provides location-related discussion-topic areas that match with the personal preference of the user in response to the vertical swipe gesture in the first direction; wherein, when the multiple discussion-topic areas run out, more location-related discussion-topic areas that match with the personal preference of the user are provided based on a range of location that gradually expands outward.

* * * * *